Figure 1:
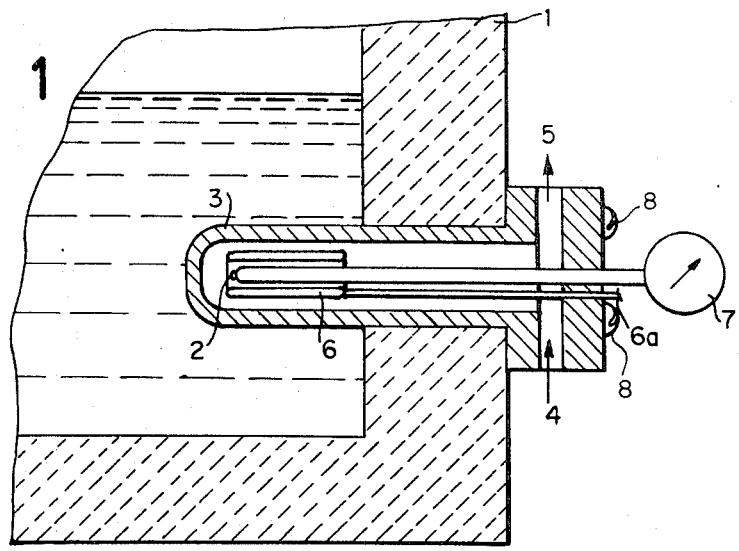

United States Patent [19]
Dorst et al.

[11] 3,774,441
[45] Nov. 27, 1973

[54] METHOD AND APPARATUS FOR THE THERMAL ANALYSIS OF METALLIC MELTS

[75] Inventors: Hans-Rudiger Dorst, Berlin; Helmut Zielinski, Muhlhausen, both of Germany

[73] Assignee: VEB Qualities-und Edelstahl-Kombiast Henningsdorf-kr., Oranineburg, Germany

[22] Filed: May 6, 1971

[21] Appl. No.: 140,716

[52] U.S. Cl. ............... 73/17 R, 73/343 R, 73/359
[51] Int. Cl. ..................... G01n 25/04, G01k 7/02
[58] Field of Search ............ 73/61 R, 61 LM, 17 R, 73/359

[56] References Cited
UNITED STATES PATENTS
3,610,045  10/1971  Shearman .................. 73/359 X
3,250,125  5/1966   Bonn ........................... 73/359 X
3,546,921  12/1970  Bourke et al. ............... 73/17 R
3,530,716  9/1970   Truppe et al. ............. 73/359 X
3,600,933  8/1971   Johnston .................... 73/17 R

*Primary Examiner*—Richard C. Queisser
*Assistant Examiner*—Joseph W. Roskos
*Attorney*—Tab T. Thein

[57] ABSTRACT

Method and apparatus for the thermal analysis of metallic melts, in particular molten carbon steels, involving the use of permanently immersed, non-expandable thermocouples.

5 Claims, 3 Drawing Figures

PATENTED NOV 27 1973 3,774,441

INVENTORS
HANS-RÜDIGER DORST
HELMUT ZIELINSKI
BY *Tab Thein*
AGENT

METHOD AND APPARATUS FOR THE THERMAL ANALYSIS OF METALLIC MELTS

It is known to utilize the effect of the melting-temperature drop of a metal, resulting from the addition thereto of an alloying constituent, particularly carbon to steel, in order to determine the percentage ratio. This is accomplished by taking a sample from the metal melt and determining the solidification temperature by means of a thermocouple (for example, an expendable, so-called "lost head" /Tec-tip-S method/). The alloying percentage ratio is then obtained by comparing the theoretical temperature of the pure liquid metal with the measured solidifiction temperature of the metal melt.

A shortcoming of this measuring method resides in that each test requires the sacrifice of a protective tube or even an entire test head, including a thermocouple element, because the latter remains frozen in the solidified melt, and each measurement involves taking a sample and filling it into an ingot mold. This requirement obviously reduces the accuracy of the measurement and renders the method less dependable.

As a result of the high temperatures of the melt surrounding the immersed thermocouple elements and the presence of readily reactive and potentially corrosive gases and other harmful substances contained therein, the elements are subjected to intensive embrittlement brought about by the heat, as well as to contamination of the wire elements or junctions, which leads to errors and to rapid wear of the measuring elements.

Attempts have been made to extend the useful life of the thermocouple elements by employing disposable one-time measuring points, so-called "lost heads." In a different approach to this problem, a wide selection of different material combinations has been tested both for the protective tubes and for the measuring wires themselves, with various degrees of success.

When using thermocouples to take temperature measurements of the metal melts it is also known to protect them by arranging for a stream of argon or other inert gas to be blown past or about the measuring points so as to blow or rinse away corrosive gases which entered through the protective tube or in some other way, or to keep them thus from the tips.

It is an important object of this invention to eliminate the shortcomings of the prior-art methods and substantially to extend the useful life of thermocouple elements.

More specifically, it is the object of this invention to provide a method and an apparatus for the thermal analysis of metallic melts, in particular molten carbon steels, by means of permanently immersed, non-expendable thermocouples, which permit to determine the temperature of the liquid metal melt while at the same time substantially reducing the danger of thermal embrittlement and contamination of the thermocouple elements.

In accordance with an important feature of the invention this objective is attained by employing a thermocouple element in a protective tube, permanently immersed in the melt which is either directly or indirectly cooled, with a layer originating from the surrounding metal melt being frozen onto the protective tube by the direct and/or indirect cooling, and following the cooling down of the thermocouple element to the solidification temperature of the frozen-on layer, the cooling procedure is interrupted, and whereupon the temperature of the melt is determined with the thermocouple, the latter then being purged by direct and/or indirect cooling.

The method of the present invention is further characterized in that a gaseous or liquid rinsing medium is used for direct cooling of the thermocouple element, which rinsing medium is non-reactive with respect to the combinations of materials adopted for the thermocouple elements.

An indirect cooling for the element, to act in an auxiliary or alternative capacity, can be provided by arranging a closed, disconnectible cooling unit inside the protective tube, in the area of the thermocouple measuring tip itself.

To be more specific, the following variants, adapted from the basic inventive method can be carried out:

I. Determining the temperature of a melt: measuring the temperature — then purging — again measuring the temperature.

II. Determining the alloying percentage of one of the chief constituents of a melt:
1. "Freezing on" a layer — measuring the melting-on temperature — purging — again "freezing on" a layer.
2. "Freezing on" a layer (at purging or regeneration temperature) — measuring the melting-on temperature — again "freezing on" a layer.

III. Determining the temperature and the alloying percentage of one of the chief constituents of a melt:
1. Measuring the temperature — "freezing on" a layer — measuring the melting-on temperaure — then purging — again measuring the temperature.
2. Measuring the temperature — "freezing on" a layer (at regeneration temperature — measuring the melting-on temperature — again measuring the temperature.

In the method variants listed hereinabove the sequence of the individual method steps, i.e. "measuring the temperature", "measuring the melting-on temperature" and "purging" can of course be varied according to needs.

To save time, purging of the thermocouple element can preferably take place between the temperature-measuring and the subsequent indirect alloying-percentage determination steps since the thermocouple element must be made to cool when determining the solidification temperature.

When "freezing" or solidifying a layer of the melt material onto the protective tube, the thermocouple element can be cooled to the regeneration temperature so that additional purging of the element can be dispensed with.

Periodical purging protects the thermocouple to a large degree from contamination and from thermally caused embrittlement, and thus greatly extends its useful life.

The periodically undertaken temperature measurements and the likewise alternate periodical determination of the alloying percentage of one of the chief constituents make it possible rapidly to obtain measured values of the principal parameters which influence the metal melt (such as temperature and alloying ratio), and thus assure a satisfactory degree of control over the process as it develops, so as to prepare an alloy of predetermined quality and composition. Hence, the removal of melt samples for testing can be greatly reduced; as it is, the results of such tests are available only with a certain delay, i.e., at a time when the momentary state of the melt may have already undergone considerable changes.

Figure 2:
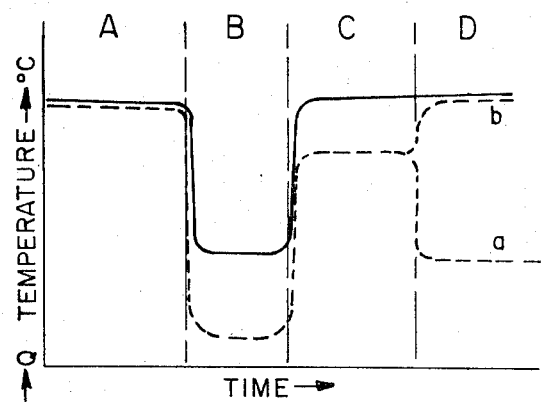
Figure 3:
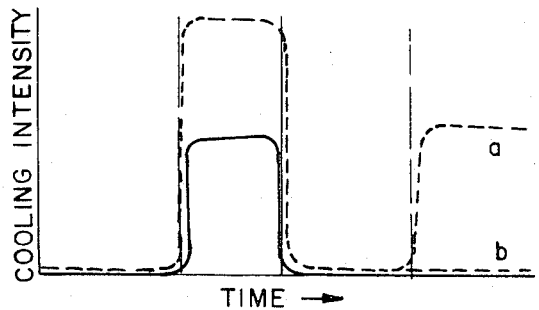

Other objects and many of the attendant advantages of the invention will be readily appreciated as the same becomes better understood by reference to the following detailed description, when considered with the accompanying drawing, wherein FIG. 1 shows in cross-section an immersion-type thermocouple element adapted for permanent immersion and being "rinsed," accommodated in a wall of a schematically shown metal-smelting furnace, and FIGS. 2 and 3 are diagrams showing the respective temperature and cooling-intensity patterns as recorded by the thermocouple according to the invention during the individual phases of the new method.

Referring now to FIG. 1, numeral 1 identifies a wall of a metal-smelting furnace, in which is accommodated a thermocouple element 2, inserted into a protective tube 3 made, for example, of aluminum oxide or zirconium oxide. The ambient temperature of element 2 is measured on the basis of the prevailing voltage, which is a function of the melt temperature, by means of a voltmeter 7. To provide direct cooling and purging for thermocouple element 2, the head of the measuring probe, which is arranged outside furnace wall 1, is equipped with an inlet 4 and an outlet 5 for a cooling medium, through which can be made to circulate a cooling and/or rinsing medium stream which thus passes over thermocouple element 2.

It will be noted from FIG. 1 of the drawing that the protective tube 3, with the thermocouple therein, is removably inserted in a wall of the furnace, e.g. by means of screws and the like, identified by numeral 8.

Since purging and measuring of the melting temperature require different cooling outputs, a regulating valve (not shown) is conneced by suitable tubes to both element 2 and a coolant container (not shown) so that the coolant stream can be regulated within narrow tolerances as a function of coolant pressure, tube cross-section and the specific method variant selected.

Non-reactive gases or liquids, such as for example argon, nitrogen, carbon dioxide and the like can be employed for the direct cooling of thermocouple 2; they are passed through inlet 4 for element 2 in order to protect the latter from contamination and thermal embrittlement, and also to cool protective tube 3 in order to "freeze" a layer of the melt material thereon.

A closed, disconnectible cooling unit 6 is arranged inside tube 3, within the area of thermocouple element 2 itself; it can be used in addition to the main or direct cooling and/or rinsing system which operates with a coolant stream, or alternatively thereto.

Cooling unit 6 can be provided in the form of, e.g., a cooling jacket or coil; it is connected with the earlier-mentioned coolant container or with a pump (not shown) by means of appropriate tubing 6a.

To purge the thermocouple element, i.e., eliminate the possibility of a corrosion of the thermocouple junction by reactive gases which may have penetrated into its protective tubing, and in order to avoid thermal embrittlement of the junctions or contacts, element 2 is cooled to a temperature substantially below its normal temperature-measuring range, and intensively rinsed by passing thereover a chemically non-reactive rinsing medium. To save time, the cooling effect can be intensified by switching on the closed cooling system 6. It is, of course, also possible to use unit 6 alone for purging thermocouple element 2, particularly when the junctions show only a moderate tendency to become corroded and penetrated gases.

The determination of the alloying percentage of one of the chief constituents of the melt, which is made indirectly by the intermediary of the melting temperature, likewise requires a direct and/or indirect cooling in order to cause the "freezing" of a lyaer of the melt material onto protective tube 3. After such a layer is applied to tube 3, the coolant stream for direct and/or indirect cooling, the latter by means of cooling unit 6, is turned off and the melting-on temperature of the "frozen" layer is measured. The alloying percentage is then determined by comparing the measured melting-on temperaure with the theoretical liquid temperature of the other chief constituent of the alloy.

The diagrams of FIGS. 2 and 3 display successive time intervals A, B, C and D (not necessarily identical) in which the phases or steps of the inventive method are carried out. In both diagrams, the solid line indicates the course of a periodical temperature determination or measurement while the interrupted line corresponds to the course of a temperature measurement combined with a determination of the alloying percentage, as has been explained earlier in the groups I., II., III. and subgroups thereof. In phase or time period D, the latter may have two variants, bifurcated and identified by letters a and b.

To summarize, the two diagrams illustrate the course of the temperature (°C) and cooling intensity (Q), respectively, in the function of time, namely I. for a periodical temperature measurement (solid lines) in whih the following steps are performed;

A - measuring the temperature
B - purging
C - again measuring the temperature; and II. for a combined temperature - alloying-percentage determination (unbroken lines) with the following steps A - measuring the temperature
B - "freezing on" a layer at regeneration temperature
C - measuring the melting-on temperature
D - variant a: purging, or
    b: measuring the temperature, substantially as was explained in the earlier-presented groups I and III, respectively, which illustrate the procedural variants of the inventive method which can be practised.

It should be understood, of course, that the foregoing disclosure relates only to preferred embodiments of the invention and that is is intended to cover all changes and modifications of the exemplary procedures and arrangements described which do not constitute departures from the spirit and scope of the invention.

Reference should be had, in closing, to a concurrently filed patent application entitled "Differential Thermoelements," by one of the present inventors, Hans-Ruediger Dorst, Ser. No. 140,750, with disclosure details which supplement the preset application.

What we claim is:

1. A method for the thermal analysis of melts, such as of molten carbon steels, with the aid of a non-expendable thermocouple inserted in a removal protective tube and immersed in the liquid melt, comprising the steps of freezing on a layer from the surrounding melt onto the protective tube by introducing a coolant into the tube and thus cooling the thermocouple therein, determining the solidification temperature of the frozen-on layer by the aid of the thermocouple, purging the latter by further introduction of the coolant with resulting further cooling thereof, substantially below its temperature measuring range, interrupting the coolant flow to the tube, and determining the temperature of the melt by means of the thermocouple.

2. The method as defined in claim 1 wherein said step of freezing on a layer onto the protective tube includes said purging step by further cooling the thermocuple to its purging temperature.

3. The method as defined in claim 1, wherein said step of cooling the thermocouple is carried out by the aid of a gaseous or liquid rinsing medium which is non-reactive with respect to the materials of the thermocouple and the protective tube.

4. An apparatus for the thermal analysis of melts, such as molten carbon steels, comprising: a non-expendable thermocouple, including a removable protective tube immersed in the liquid melt; means for introducing a coolant into said tube, circulating the same about said thermocouple and discharging the same from said tube, thereby to cool said thermocouple; and a closed, disconnectible cooling unit surrounding said thermocouple the form of a cooling jacket, and being disposed within said protective tube.

5. The apparatus as defined in claim 4, wherein said means for introducing, circulating and discharging the coolant includes means for circulating a gaseous or liquid rinsing medium in said protective tube, which is non-reactive with respect to the materials of said thermocouple and said tube.

* * * * *

UNITED STATES PATENT OFFICE
CERTIFICATE OF CORRECTION

PATENT NO. 3,774,441
DATED    November 27, 1973
INVENTOR(S) Hans-Rudiger Dorst et al It is certified that error appears in the above-identified patent and that said Letters Patent are hereby corrected as shown below:

Correct the Assignee [73] to read: VEB Qualitäts- und Edelstahl-Kombinat, Hennigsdorf/Kr. Oranienburg, Germany;

Column 1, line 10, correct the spelling of "Tectip-S";
        line 13, correct the spelling of "solidifcation";
column 2, line 14, change "variants," to -- variants --;
        line 33, change "temperature" to -- temperature) --;
column 4, line 3, change "and" to -- by --;
        line 8, correct the spelling of "layer";
        line 33, correct the spelling of "which";
        lines 43 and 44, change to read:
    -- D - variant a: purging, or
           "      b: measuring the temperature, --;
        line 63 (claim 1, line 3), change "removal" to -- removable --;
column 5, line 8 (claim 2, line 1), change "1" to -- 1, --;
        line 10 ( "    "    " 3), correct the spelling of "thermocouple"; and
column 6, line 8 (claim 4, line 9), before "the form" insert -- in --; finally
column 4, line 59, change "preset application." to -- present application, now U.S. Patent 3,757,206 dated September 4, 1973. --.

Signed and Sealed this twenty-second Day of June 1976

[SEAL]

Attest:

RUTH C. MASON
Attesting Officer

C. MARSHALL DANN
Commissioner of Patents and Trademarks